United States Patent
Yamamoto et al.

(10) Patent No.: US 11,625,518 B2
(45) Date of Patent: Apr. 11, 2023

(54) LEARNING DEVICE, INFERENCE DEVICE, AND LEARNED MODEL

(71) Applicant: Tokyo Electron Limited, Tokyo (JP)

(72) Inventors: Kosuke Yamamoto, Nirasaki (JP); Motoshi Fukudome, Nirasaki (JP); Ken Itabashi, Nirasaki (JP); Naoshige Fushimi, Nirasaki (JP); Kazuyoshi Matsuzaki, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 104 days.

(21) Appl. No.: 17/274,739

(22) PCT Filed: Aug. 29, 2019

(86) PCT No.: PCT/JP2019/033861
§ 371 (c)(1),
(2) Date: Mar. 9, 2021

(87) PCT Pub. No.: WO2020/054443
PCT Pub. Date: Mar. 19, 2020

(65) Prior Publication Data
US 2022/0050943 A1     Feb. 17, 2022

(30) Foreign Application Priority Data
Sep. 12, 2018   (JP) .............................. JP2018-171015

(51) Int. Cl.
G06F 30/27   (2020.01)
G06F 119/18  (2020.01)
G06N 3/02    (2006.01)

(52) U.S. Cl.
CPC .............. *G06F 30/27* (2020.01); *G06N 3/02* (2013.01); *G06F 2119/18* (2020.01)

(58) Field of Classification Search
USPC .......................................................... 716/54
See application file for complete search history.

(56) References Cited

U.S. PATENT DOCUMENTS

| | | |
|---|---|---|
| 7,181,355 B2 | 2/2007 | Kondo et al. |
| 10,534,355 B2 | 1/2020 | Kuboi et al. |
| 2019/0286111 A1* | 9/2019 | Yennie .............. H01L 21/67092 |

FOREIGN PATENT DOCUMENTS

| | | |
|---|---|---|
| JP | 2002149221 A | 5/2002 |
| JP | 201658465 A | 4/2016 |

(Continued)

OTHER PUBLICATIONS

International Search Report for PCT/JP2019/033861, dated Oct. 15, 2019, 2 pages.

*Primary Examiner* — Bryce M Aisaka
(74) *Attorney, Agent, or Firm* — Armstrong Teasdale LLP

(57) ABSTRACT

A learning device for performing a machine learning based on a learning model using data input to an input layer, includes: a calculation part configured to calculate a predetermined number of features, in which simulation data as a result of simulating semiconductor manufacturing processes by setting environmental information inside a process vessel in which the semiconductor manufacturing processes are performed and using a predetermined component provided in the process vessel as a variable, and XY coordinates parallel to a plane of a wafer are associated with each other; and an input part configured to input the calculated predetermined number of features to the input layer.

17 Claims, 9 Drawing Sheets

(56) References Cited

FOREIGN PATENT DOCUMENTS

| JP | 201826558 A | 2/2018 |
|---|---|---|
| WO | 2016132759 A1 | 8/2016 |

\* cited by examiner

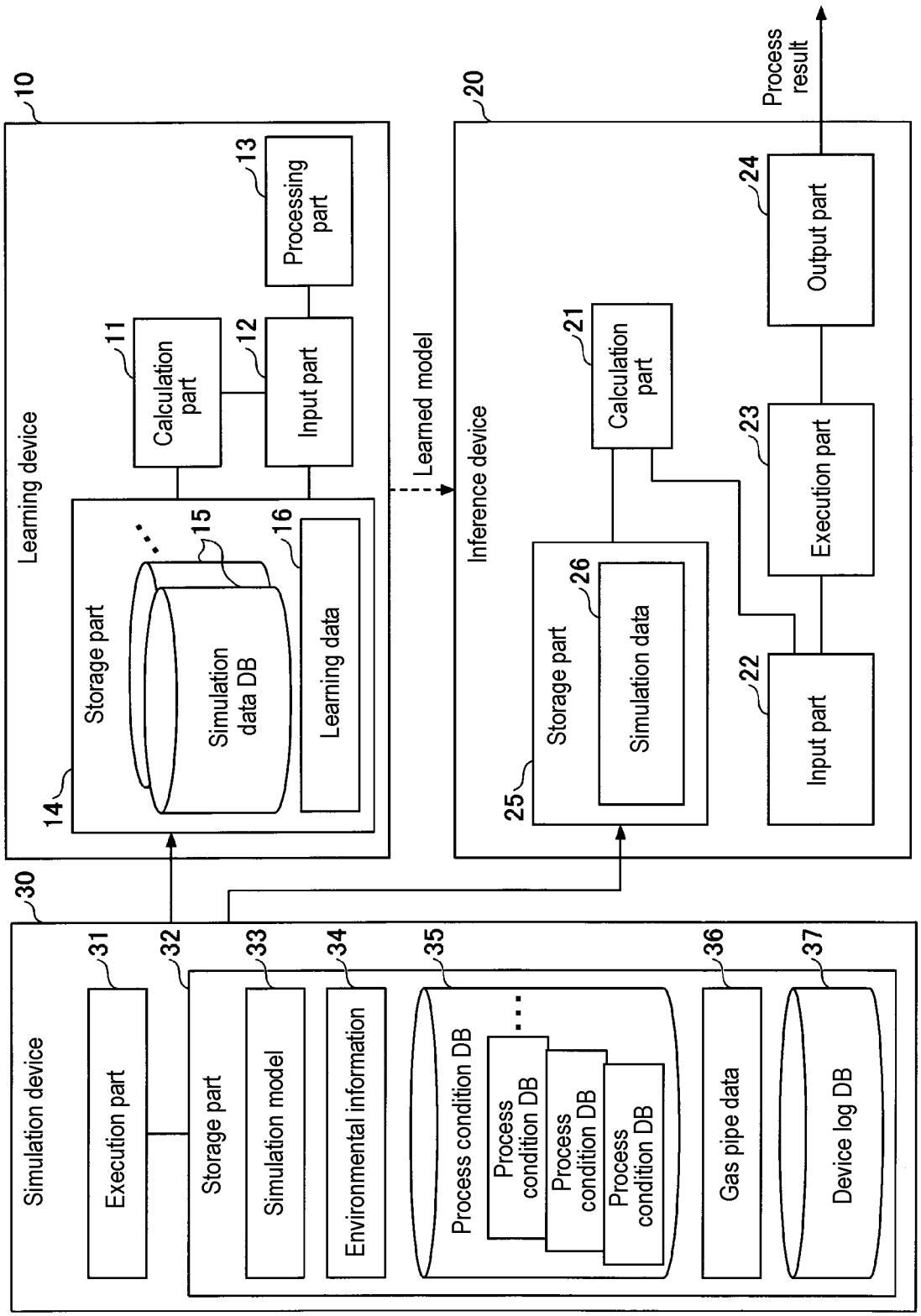

FIG. 4

| Process | Learning data | | |
|---|---|---|---|
| | ID | Gas pipe data | Wafer surface image data | Feature vectors |

| Process | ID | Gas pipe data | Wafer surface image data | Feature vectors |
|---|---|---|---|---|
| Process A | M01 | Shape a | AR | $(X_1,Y_1,AR_{11}),(X_2,Y_1,AR_{12}),\cdots(X_5,Y_5,AR_{55})$ |
| | M02 | Shape b | AS | $(X_1,Y_1,AS_{11}),(X_2,Y_1,AS_{12}),\cdots(X_5,Y_5,AS_{55})$ |
| | M03 | Shape c | AT | $(X_1,Y_1,AT_{11}),(X_2,Y_1,AT_{12}),\cdots(X_5,Y_5,AT_{55})$ |
| | ... | ... | ... | ... |
| Process B | M04 | Shape a | BR | $(X_1,Y_1,BR_{11}),(X_2,Y_1,BR_{12}),\cdots(X_5,Y_5,BR_{55})$ |
| | M05 | Shape b | BS | $(X_1,Y_1,BS_{11}),(X_2,Y_1,BS_{12}),\cdots(X_5,Y_5,BS_{55})$ |
| | M06 | Shape c | BT | $(X_1,Y_1,BT_{11}),(X_2,Y_1,BT_{12}),\cdots(X_5,Y_5,BT_{55})$ |
| | ... | ... | ... | ... |
| Process C | M07 | Shape a | CR | $(X_1,Y_1,CR_{11}),(X_2,Y_1,CR_{12}),\cdots(X_5,Y_5,CR_{55})$ |
| | M08 | Shape b | CS | $(X_1,Y_1,CS_{11}),(X_2,Y_1,CS_{12}),\cdots(X_5,Y_5,CS_{55})$ |
| | M09 | Shape c | CT | $(X_1,Y_1,CT_{11}),(X_2,Y_1,CT_{12}),\cdots(X_5,Y_5,CT_{55})$ |
| ... | | | | |

LEARNING DEVICE, INFERENCE DEVICE, AND LEARNED MODEL

CROSS-REFERENCE TO RELATED APPLICATIONS

This application is a National Stage Application of International Patent Application No. PCT/JP2019/033861, having an International Filing Date of Aug. 29, 2019, which claims the benefit of priority to Japanese Patent Application No. 2018-171015, filed Sep. 12, 2018, the entire contents of each of which are hereby incorporated by reference herein.

TECHNICAL FIELD

The present disclosure relates to a learning device, an inference device, and a learned model.

BACKGROUND

For example, Patent Document 1 suggests efficient estimation of physical quantities when repeatedly performing a simulation of an etching process while changing parameters.

PRIOR ART DOCUMENT

Patent Document

Patent Document 1: International Publication No. 2016/132759

SUMMARY

The present disclosure provides a technique capable of efficiently performing a simulation of a semiconductor manufacturing process.

According to one embodiment of the present disclosure, a learning device for performing a machine learning based on a learning model using data input to an input layer is provided. The learning device includes: a calculation part configured to calculate a predetermined number of features, in which simulation data of a result of performing simulation of semiconductor manufacturing processes by setting environmental information inside a process vessel in which the semiconductor manufacturing processes are performed and using a predetermined component provided in the process vessel as a variable, and XY coordinates parallel to a plane of a wafer are associated with each other; and an input part configured to input the calculated predetermined number of features to the input layer.

According to one aspect, it is possible to efficiently perform a simulation of a semiconductor manufacturing process.

BRIEF DESCRIPTION OF DRAWINGS

FIG. 1 is a diagram illustrating an example of an overall configuration of a simulation system according to an embodiment of the present disclosure.

FIG. 4 is a diagram illustrating an example of learning data according to an embodiment of the present disclosure.

DETAILED DESCRIPTION

Figure 2A:
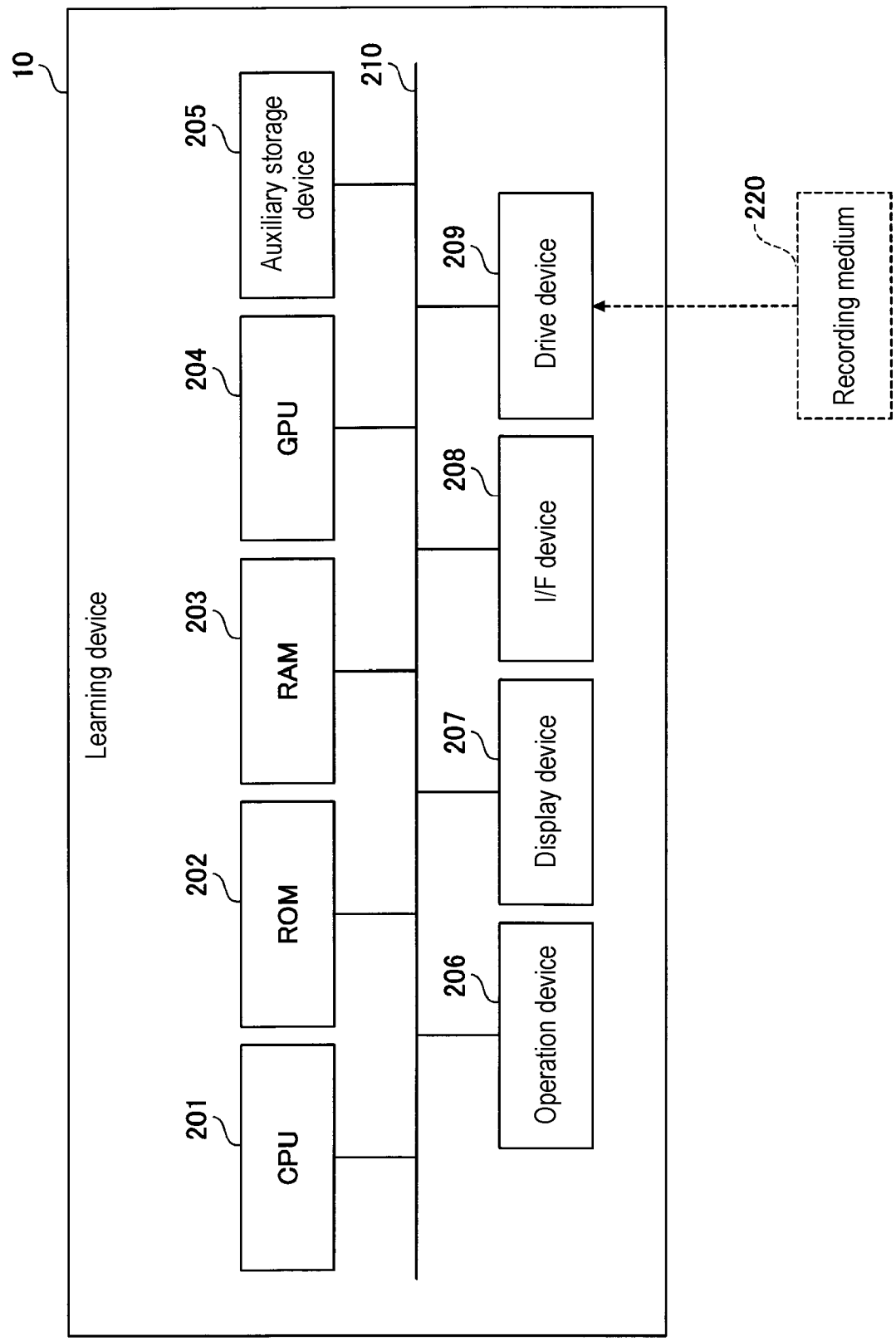
FIG. 2A is a diagram illustrating an example of a hardware configuration of a learning device according to an embodiment of the present disclosure.

Embodiments of the present disclosure will now be described in detail with reference to the accompanying drawing. Further, in the present specification and drawings, like components are denoted by like reference numerals and a repeated description thereof will be omitted.

[Overall Configuration of Simulation System]

First, an overall configuration of a simulation system for executing simulation of a semiconductor manufacturing process according to an embodiment of the present disclosure will be described. FIG. 1 is a diagram illustrating an example of an overall configuration of the simulation system. As illustrated in FIG. 1, the simulation system includes a learning device 10, an inference device 20, and a simulation device 30. In addition, in the present embodiment, various data handled by the simulation system are acquired mainly by a semiconductor manufacturer.

Further, a semiconductor manufacturing apparatus that performs the semiconductor manufacturing process may be applied to any type of device, such as capacitively coupled plasma (CCP), inductively coupled plasma (ICP), radial line slot antenna (RLSA), electron cyclotron resonance plasma (ECR), and helicon wave plasma (HWP).

When a plurality of unprocessed wafers (processing targets) are transferred, the semiconductor manufacturing apparatus executes processing (hereinafter, referred to as "wafer processing") corresponding to each process (for example, film formation, etching, ashing, or cleaning) of semiconductor manufacturing processes.

(Simulation Device)

The simulation device 30 simulates each process of the semiconductor manufacturing processes by setting conditions of the semiconductor manufacturing process (hereinafter, referred to as "process conditions") or environmental information indicating internal environmental conditions in a process vessel of the semiconductor manufacturing apparatus, and outputs the resulting simulation data. An example of the simulation data may be image data or numerical data indicating characteristics of film formation or etching on a plane of the wafer. Further, the simulation data may include process conditions, environmental information, and information on a process or a predetermined component to be simulated.

As illustrated in FIG. 1, the simulation device 30 includes an execution part 31 and a storage part 32. The simulation of the semiconductor manufacturing process is executed by the execution part 31 of the simulation device 30. The execution part 31 sets information on a hardware configuration of the semiconductor manufacturing apparatus, environmental information and process conditions, and executes the simulation according to a simulation model. Various data set by the simulation are stored in the storage part 32.

A simulation model for each process as a simulation model 33 is stored in the storage part 32. For example, a simulation model for a film forming process is defined for the simulation of the film forming process. In addition, a simulation model for an etching process is defined for the simulation of the etching process. A simulation model for ashing is defined for the simulation of the ashing process, and a simulation model for cleaning is defined for the simulation of the cleaning process.

The environmental information 34 is data indicating internal environmental conditions of the process vessel when simulating wafer processing in the semiconductor manufacturing apparatus. An example of the environmental information 34 may be conditions for gas flow. In this case, in order to allow a pre-standardized gas to flow through a gas pipe for performing the simulation, the environmental information 34 may be set, for example, to allow a gas A having a density of 1 at 1 sccm to flow through the gas pipe. The gas pipe at this time is an example of a predetermined component provided in the process vessel, in which each shape may be simulated for a plurality of shapes of the gas pipe. Other examples of the environmental information 34 may be those related to a temperature of the predetermined component provided in the process vessel, and the like.

Process conditions corresponding to each process of the manufacturing processes are set in a process condition database (DB) 35. For example, a process time, a pressure (gas exhaust), high frequency power or voltage, or various gas flow rates, which are control information of the semiconductor manufacturing apparatus, may be set as the process conditions. Further, an internal temperature of the process vessel (temperature of an upper electrode, temperature of a sidewall of the process vessel, temperature of the wafer W, temperature of an electrostatic chuck, or the like), a temperature of refrigerant output from a chiller, or the like may be set as the process conditions.

Gas pipe data 36 is data indicating a hardware configuration of a predetermined component inside the process vessel of the semiconductor manufacturing apparatus. For example, when the predetermined component is a gas pipe, shape information such as a length of the gas pipe, a diameter of the gas pipe or the like is stored as the gas pipe data 36.

A device log database (DB) 37 stores log data such as an RF usage time, a pressure, a temperature or the like when the semiconductor manufacturing apparatus is used. For example, when considering changes over time in the semiconductor manufacturing apparatus in the simulation, log data corresponding to the simulation is used.

The simulation device 30 sets the simulation model 33, the environmental information 34, the process conditions selected from the process condition DB 35, and the shape information of the gas pipe selected from the gas pipe data 36. Then, the simulation device 30 performs the simulation of the semiconductor manufacturing process by using the predetermined component provided in the process vessel as a variable. The resulting simulation data is transmitted to the learning device 10 and stored in the simulation data database (DB) 15.

(Learning Device)

The learning device 10 performs machine learning based on a learning model using data input to an input layer. The learning device 10 includes a calculation part 11, an input part 12, a processing part 13 and a storage part 14. An input data generation program and a learning program are installed on the learning device 10, and when the programs are executed, the learning device 10 functions as the calculation part 11 and the processing part 13.

The calculation part 11 reads the simulation data (process result data by the simulation device 30) in the simulation data DB 15 stored in the storage part 14, and processes the same into a predetermined number of feature vectors suitable for learning by the processing part 13. The processed feature vectors are input to the input layer of the learning model.

As an example of the processing, the calculation part 11 may process the simulation data on the plane of the wafer into a two-dimensional array form of XY coordinates parallel to the plane of the wafer according to a vertical size and a horizontal size of the plane of the wafer. The calculation part 11 calculates the predetermined number of feature vectors in which the simulation data on the plane of the wafer and the XY coordinates parallel to the plane of the wafer are associated with each other. The calculated predetermined number of feature vectors are an example of a predetermined number of features in which the simulation data and the XY coordinates parallel to the plane of the wafer are associated with each other.

Further, a learning model included in the processing part 13 may use input data in the form of numerical data indicating a process result on the plane of the wafer as the feature vectors, or use input data in the form of image data.

In the present embodiment, the processed feature vectors are stored in learning data 16. However, the processing of the data is not limited thereto but may be performed when being stored in the simulation data DB 15. In this case, the simulation data processed into the form of the two-dimensional array is stored as the learning data 16 in the simulation data DB 15, and is read by the calculation part 11. The input part 12 sequentially inputs the predetermined number of feature vectors processed into the two-dimensional array form to the input layer when performing the machine learning.

The input part 12 sequentially inputs the predetermined number of feature vectors calculated by the calculation part 11 to the input layer of the learning model. The processing part 13 performs the simulation of the semiconductor manufacturing process using the predetermined number of features input to the input layer as teacher data.

Thus, the processing part 13 generates a learned model by the machine learning and outputs a simulation result. The learned model generated by the processing part 13 is provided to the inference device 20 and installed on the inference device 20.

(Inference Device)

The inference device 20 performs the simulation of the semiconductor manufacturing process using the learned model learned by the learning device 10. The inference device 20 includes a calculation part 21, an input part 22, an execution part 23, an output part 24, and a storage part 25. An input data generation program and an inference program are installed on the inference device 20, and when the programs are executed, the inference device 20 functions as the calculation part 21 and the execution part 23.

The calculation part 21 reads simulation data 26 as an inference target (process result data of the inference target by the simulation device 30) stored in the storage part 25, and processes the same into a predetermined number of feature vectors suitable for simulation executed by the execution part 23. The processed feature vectors are input to an input layer of the learned model.

The calculation part 21 processes the simulation data 26 into a two-dimensional array form of XY coordinates parallel to the plane of the wafer according to the vertical size and the horizontal size of the plane of the wafer. The calculation part 21 reads the simulation data 26 as a result of simulating the semiconductor manufacturing process when setting a new component to be inferred (for example, new shape data of the gas pipe) by using the gas pipe data 36 as a variable. Then, the calculation part 21 calculates a predetermined number of feature vectors in which the read simulation data 26 and the XY coordinates parallel to the plane of the wafer are associated with each other. The calculated predetermined number of feature vectors are an example of a predetermined number of features in which the simulation data and the XY coordinates parallel to the plane of the wafer are associated with each other.

The execution part 23 executes the learned model by sequential input of the predetermined number of feature vectors from the input part 22, to output a simulation result. An example of the output simulation result may be information indicating characteristics of film formation or etching on the plane of the wafer (for example, wafer-plane image data).

[Hardware Configuration of Each Device Constituting the Simulation System]

Figure 2B:
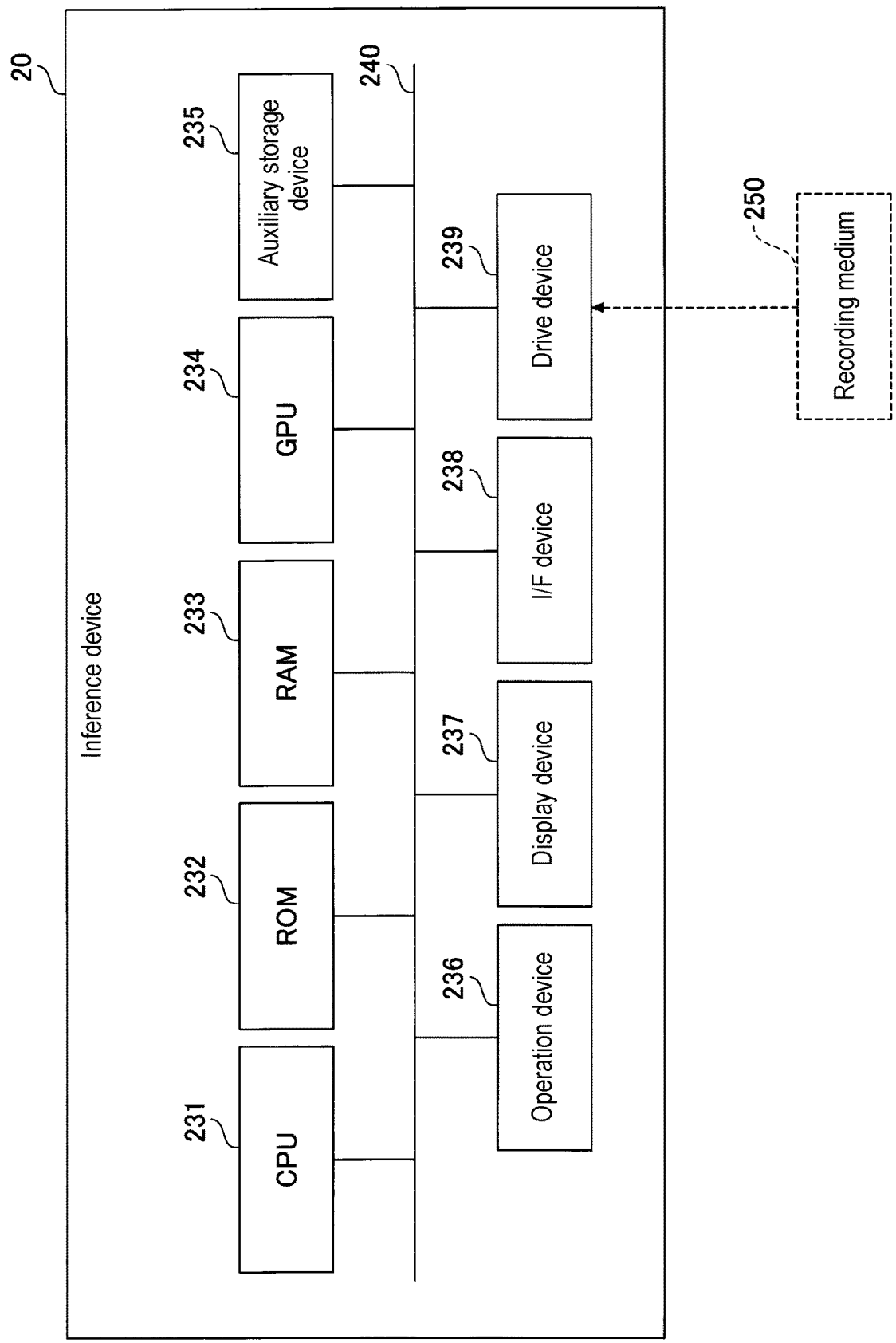
FIG. 2B is a diagram illustrating an example of a hardware configuration of an inference device according to an embodiment of the present disclosure.

Next, a hardware configuration of each of the devices (the learning device 10 and the inference device 20) constituting the simulation system will be described with reference to FIGS. 2A and 2B. FIG. 2A is a diagram illustrating an example of the hardware configuration of the learning device 10 according to an embodiment of the present disclosure. FIG. 2B is a diagram illustrating an example of the hardware configuration of the inference device 20 according to an embodiment of the present disclosure.

As illustrated in FIG. 2A, the learning device 10 includes a central processing unit (CPU) 201 and a read only memory (ROM) 202. In addition, the learning device 10 includes a random access memory (RAM) 203 and a graphics processing unit (GPU) 204. The CPU 201, the ROM 202, the RAM 203 and the GPU 204 form a so-called computer.

Further, the learning device 10 includes an auxiliary storage device 205, an operation device 206, a display device 207, an interface (I/F) device 208, and a drive device 209. The individual hardware of the learning device 10 is connected to each other via a bus 210.

The CPU 201 is an arithmetic device that executes various programs (for example, the input data generation program, the learning program, and the like) installed in the auxiliary storage device 205.

The ROM 202 is a non-volatile memory and functions as a main storage device. The ROM 202 stores various programs, data or the like necessary for the CPU 201 to execute various programs installed in the auxiliary storage device 205. Specifically, the ROM 202 stores a boot program such as a basic input/output system (BIOS) or an extensible firmware interface (EFI), or the like.

The RAM 203 is a volatile memory such as a dynamic random access memory (DRAM) or a static random access memory (SRAM), and functions as a main storage device. The RAM 203 provides a work area that is expanded when various programs installed in the auxiliary storage device 205 are executed by the CPU 201.

The GPU 204 is an arithmetic device for image processing, and performs a high-speed arithmetic operation by parallel processing on the input data when the input data generation program and the learning program are executed by the CPU 201. Furthermore, the GPU 204 is equipped with an internal memory (GPU memory), and temporarily stores information necessary for performing the parallel processing.

The auxiliary storage device 205 stores various programs, or the learning data 16 processed by the GPU 204, the simulation data or the like when various programs are executed by the CPU 201. For example, the simulation data DB 15 or the storage part 14 is implemented in the auxiliary storage device 205.

The operation device 206 is an input device used when an administrator of the learning device 10 inputs various instructions to the learning device 10. The display device 207 is a display device that displays the internal state of the learning device 10. The I/F device 208 is a connection device to connect with another device so as to perform communications.

The drive device 209 is a device for setting a recording medium 220. The recording medium 220 referred to herein includes a medium, which optically, electrically or magnetically stores information, such as a CD-ROM, a flexible disc, a magneto-optical disc or the like. Further, the recording medium 220 may include a semiconductor memory, and the like which electrically stores information, such as a ROM, a flash memory or the like.

In addition, various programs that are installed in the auxiliary storage device 205 are installed, for example, by setting the distributed recording medium 220 in the drive device 209 and reading the various programs stored in the recording medium 220 by the drive device 209. Alternatively, various programs installed in the auxiliary storage device 205 may be installed by being downloaded via a network (not shown).

As illustrated in FIG. 2B, the inference device 20 includes a CPU 231, a ROM 232, a RAM 233, a GPU 234, an auxiliary storage device 235, an operation device 236, a display device 237, an I/F device 238, and a drive device 239. The individual hardware of the inference device 20 is connected to each other via a bus 240. The drive device 239 can be connected to the recording medium 250. Since the hardware configuration of the inference device 20 is identical to the hardware configuration of the learning device 10, the description of the hardware configuration of the inference device 20 will be omitted.

[Description of the Learning Data]

Figure 3:
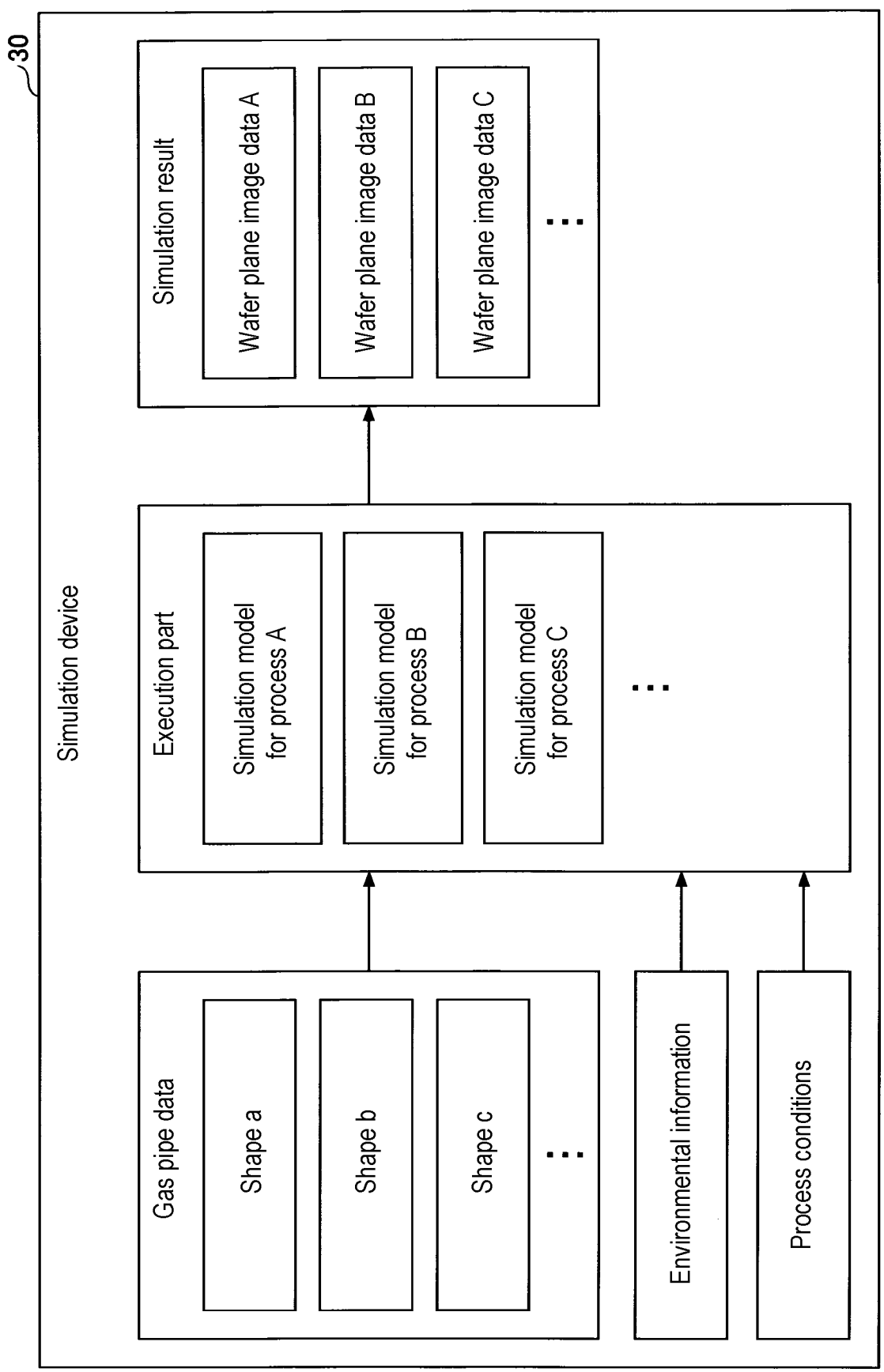
FIG. 3 is a diagram for explaining a simulation performed by a simulation device according to an embodiment of the present disclosure.

Next, the learning data 16 generated from the simulation data stored in the simulation data DB 15 will be described. FIG. 3 is a diagram illustrating an example of a simulation performed by the simulation device 30 that generates the simulation data stored in the simulation data DB 15. FIG. 4 is a diagram illustrating an example of the learning data generated from the simulation data indicating a simulation result.

As illustrated in FIG. 3, by setting the environmental information and the process conditions in the simulation device 30, the environment and the process conditions in the process vessel in the simulation of the semiconductor manufacturing process can be set to be constant. Therefore, the execution part 31 can perform the simulation based on the simulation model for each process by using only a hardware configuration (shape data a, b, c . . . ) of a predetermined component (for example, a gas pipe) as a variable and fixing other simulation conditions.

As a result, the simulation device 30 can obtain a simulation result corresponding to the hardware configuration of the predetermined component on a one-to-one basis, and by transmitting it as simulation data (for example, the wafer-plane image data A, B, C . . . ) to the leaning device 10, the learning device 10 can use the simulation data. Accordingly, the features of the hardware configuration of the predetermined component of the learning device 10 can be input to the input layer as the feature vectors.

For example, the environmental conditions for the flow of a gas inside the process vessel are set to be constant (for example, the gas A having a density of 1 is set to 1 sccm, or the like), and the process conditions (a pressure, a temperature, the like) for each process are set to be constant. Then, when the hardware configuration of the gas pipe (shape data with different length and diameter of the pipe) is given as a variable and the simulation is executed according to the simulation model for each process, simulation conditions other than the hardware configuration of the gas pipe can be fixed. Therefore, for example, the predetermined number of feature vectors calculated from the simulation data, which is the wafer-plane image data, are associated with features that characterize a specific shape of the gas pipe in a one-to-one relationship. Thus, the learning device 10 can generate a learned model that outputs the process result corresponding to the hardware configuration of the predetermined component by inputting the information on the hardware configuration of the predetermined component as the input data of the learning model and executing the learning model.

FIG. 4 illustrates an example of the learning data including the predetermined number of feature vectors calculated by the calculation part 11 of the learning device 10 from the simulation data. The learning data includes a "process," a "(simulation) ID," "gas pipe data (shape information)," "wafer-plane image data," and "feature vectors" as information items.

Known processes of simulations executed by the simulation device 30 are stored in the "process." Identifiers for identifying the simulations executed by the simulation device 30 are stored in the "ID."

Shape information of the gas pipe determined from a length, a diameter or the like of the gas pipe is stored in the "gas pipe data." However, the "gas pipe" is an example of the component in the process vessel of the semiconductor manufacturing apparatus, and is not limited to the gas pipe and may be replaced by information on the hardware configuration of any component as long as it is a component inside the process vessel of the semiconductor manufacturing apparatus.

The "wafer-plane image data" is an example of simulation data indicating a process result which is a result of simulation by the simulation device 30. Other examples of the simulation data indicating the process result may include a quality (a resistance value or the like) of a film formed on the plane of the wafer, a composition ratio, a density, a deposition rate, an etching rate, and an optical constant such as a refractive index of light irradiated to the plane of the wafer, a light absorption coefficient or the like.

Figure 5:
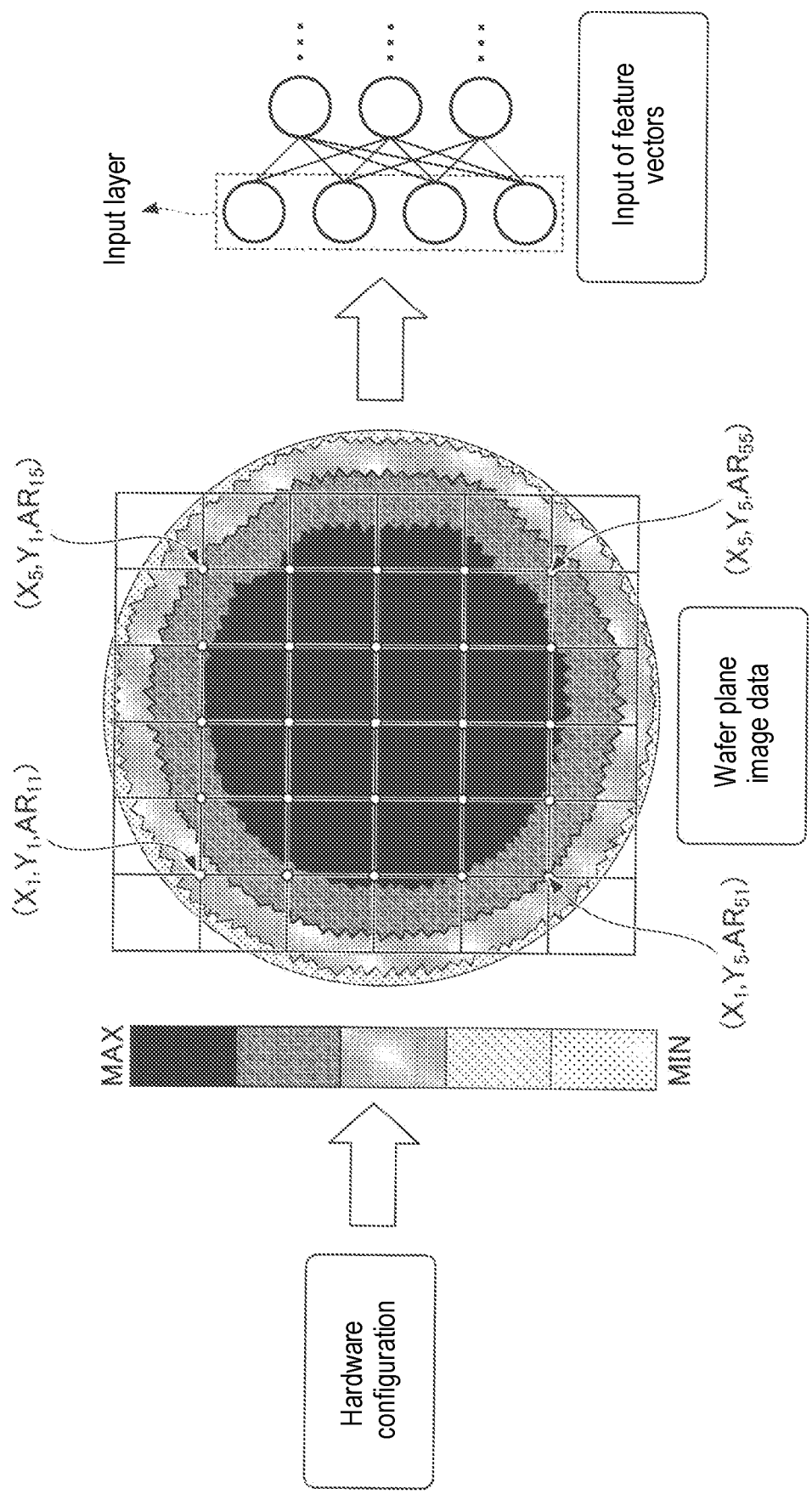
FIG. 5 is a diagram illustrating an example of simulation data (wafer-plane image data) and feature vectors according to an embodiment of the present disclosure.

The "feature vector" indicates a feature at each XY coordinate in which a predetermined number of XY coordinates and simulation data are associated with each other. In an example of FIG. 5, among the XY coordinates parallel to the plane of the wafer, 25 XY coordinates $(X_1, Y_1)$ to $(X_5, Y_1)$ to $(X_1, Y_5)$ to $(X_5, Y_5)$ scattered at equal intervals are specified. Then, 25 feature vectors in which the 25 XY coordinates and simulation data ($AR_{11}$ to $AR_{15}$ to $AR_{51}$ to $AR_{55}$) at each XY coordinate are associated with each other are calculated. In the example of FIG. 5, 25 feature vectors of $(X_1, Y_1, AR_{11})$ to $(X_5, Y_1, AR_{15})$ to $(X_1, Y_5, AR_{55})$ to $(X_5, Y_5, AR_{55})$ are calculated, but the position and number of XY coordinates are not limited thereto.

As illustrated in FIG. 4, the calculated feature vectors are stored as the learning data 16 in the storage part 14 corresponding to the gas pipe data for each process. According to this method, the predetermined number of feature vectors can be calculated by mapping the simulation data on the plane of the wafer. That is, monitor points can be fixed by determining in advance and standardizing $(X_i, Y_i)$ ($i \geq 1$) on the plane of the wafer. Thus, efficient learning becomes possible by having the number of feature vectors to be input to the input layer of the schematic diagram of the learning model indicated on the right side of FIG. 5.

Further, according to this method, simulation conditions other than the hardware configuration of the predetermined component can be fixed. Thus, the 25 feature vectors extracted from the simulation data can be input to the input layer of the learning model as features that characterize the hardware configuration of the predetermined component. This enables learning according to the hardware configuration of the gas pipe.

However, the number of feature vectors input to the input layer may not be constant. For example, $(X_i, Y_i)$ on the plane of the wafer is not fixed but may be a variable position in the plane of the wafer. Thus, the predetermined number of feature vectors input to the input layer of the learning model can be made variable.

Further, in the simulation according to the present embodiment, the gas flow is simulated for the hardware configuration of the gas pipe, and the resulting process result is output as the wafer-plane image data, but the present disclosure is not limited thereto. For example, the present disclosure may be used for various simulations of the manufacturing process, such as simulating a wafer temperature for the hardware configuration of a stage on which the wafer is placed, outputting image data indicating a temperature distribution on the plane of the wafer as the process result, and the like.

Furthermore, the teaching data used for learning is not limited to the simulation data but may be data actually performed using the semiconductor manufacturing apparatus or may include such data.

By performing the machine learning in the learning device 10 and installing the generated learned model in the inference device 20, the inference device 20 can perform process estimation of known processes A and B for a new component using the learned model. In addition, the inference device 20 may perform process estimation of unknown processes A' and B' for the new component using the learned model.

[Flow of the Simulation Process by the Simulation Device]

Figure 6:
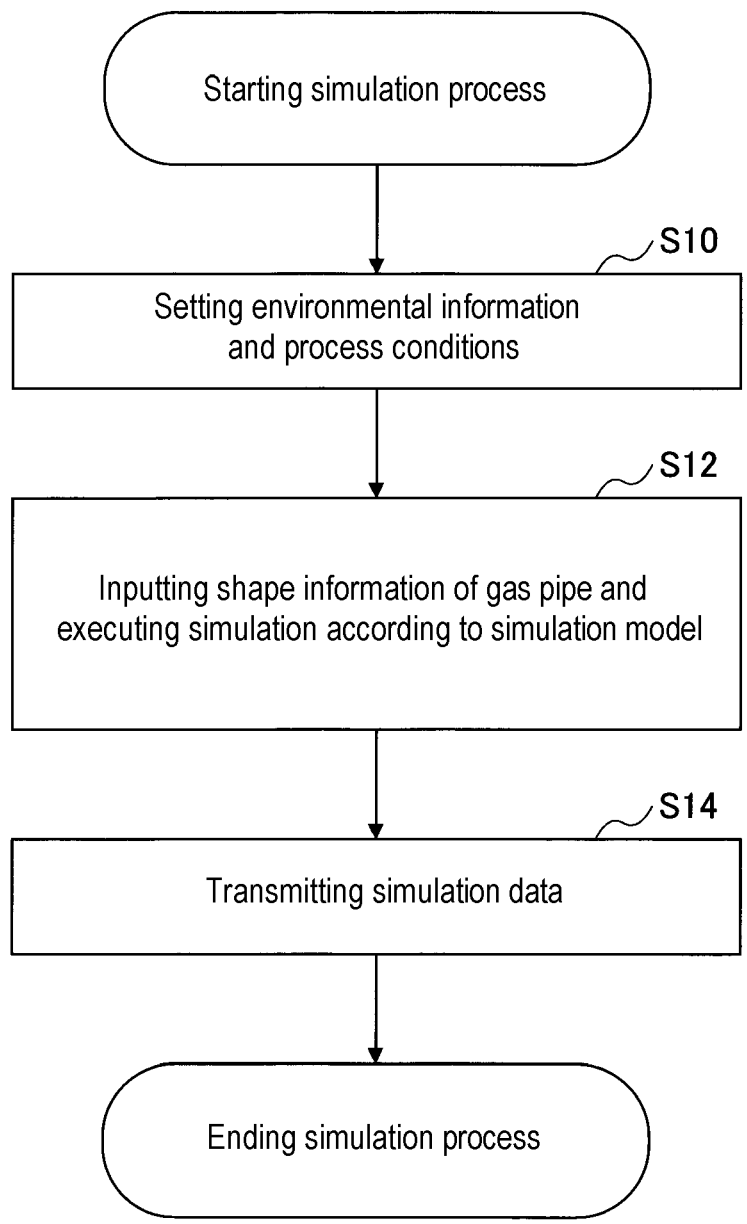
FIG. 6 is a flowchart illustrating an example of a simulation process according to an embodiment of the present disclosure.

Next, a flow of a simulation process by the simulation device 30 will be described. FIG. 6 is a flowchart illustrating an example of the simulation process according to an embodiment of the present disclosure. When an instruction to perform the simulation is input, the simulation device 30 executes the flowchart illustrated in FIG. 6.

First, in step S10, the execution part 31 sets the environmental information 34 inside the process vessel in which the semiconductor manufacturing process is performed. Further, the execution part 31 selects process conditions for a process to be simulated (for example, a film forming process) from the process condition DB 35 and sets the same.

Subsequently, in step S12, the execution part 31 executes the simulation according to the simulation model 33 corresponding to the process to be simulated by selecting a target component (shape information of the gas pipe) from the gas pipe data 36 and inputting the same.

Subsequently, in step S14, the execution part 31 transmits simulation data of the simulation result to the learning device 10 and ends the simulation process. Thus, the simulation data is stored in the simulation data DB 15 of the learning device 10 illustrated in FIG. 1.

[Flow of the Learning Process by the Learning Device]

Figure 7:
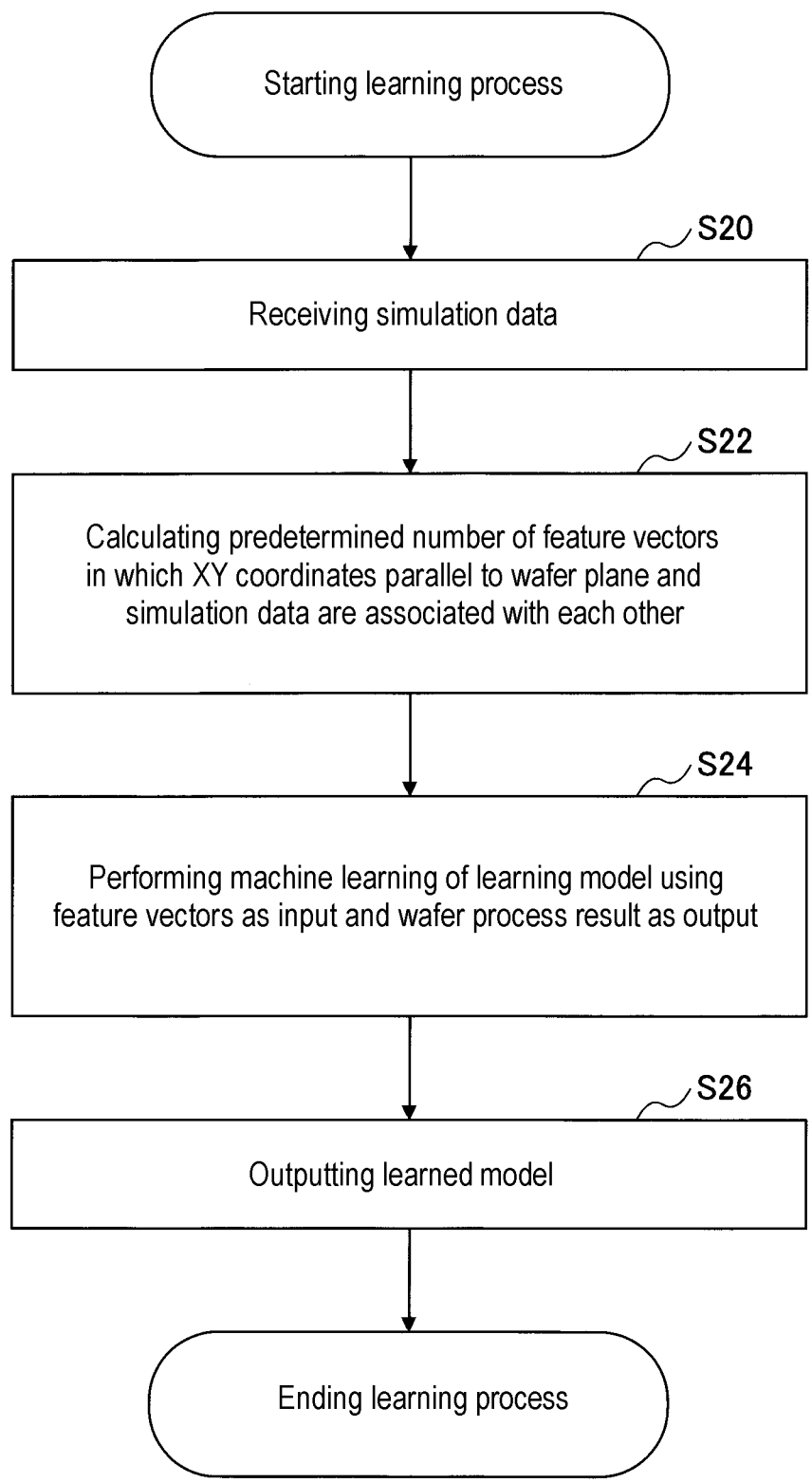
FIG. 7 is a flowchart illustrating an example of a learning process according to an embodiment of the present disclosure.

Next, a flow of a learning process by the learning device 10 will be described. FIG. 7 is a flowchart illustrating an example of the learning process according to an embodiment of the present disclosure. When an instruction to execute the machine learning is input, the learning device 10 executes the flowchart illustrated in FIG. 7.

First, in step S20, the learning device 10 receives the simulation data from the simulation device 30 and stores it in the simulation data DB 15.

Next, in step S22, the calculation part 11 calculates a predetermined number of feature vectors in which the simulation data and the XY coordinates parallel to the plane of the wafer are associated with each other, and stores them in the learning data 16. Each time the simulation data is received, the calculation part 11 repeats the process of calculating the predetermined number of feature vectors in which the simulation data and the XY coordinates are associated with each other and stores the calculated result in the learning data 16.

Subsequently, in step S24, the input part 12 sequentially inputs the calculated predetermined number of feature vectors to the input layer of the learning model. Then, the processing part 13 executes the machine learning by the learning model of the semiconductor manufacturing process for the predetermined component by using the feature vectors as the input data and the wafer processing result as the output data, and by using the teacher data.

Subsequently, in step S26, the processing part 13 outputs the learned model, which is the learned learning model, and ends the learning process.

[Flow of the Inference Process by the Inference Device]

A flow of an inference process by the inference device 20 is different from the learning process by the learning device 10 in that the process is performed using the learned model, and other processes are substantially identical. When an instruction to execute the simulation is input, the inference device 20 first receives the simulation data from the simulation device 30 and stores it in the storage part 25. The received simulation data is, for example, simulation result data of a new component (for example, new shape of the gas pipe) executed by the simulation device 30.

Subsequently, the calculation part 21 calculates a predetermined number of feature vectors in which the simulation data and the XY coordinates parallel to the plane of the wafer are associated with each other. Then, the input part 22 sequentially inputs the calculated predetermined number of feature vectors to the input layer of the learned model.

Subsequently, the execution part 23 executes the learned model using the calculated predetermined number of feature vectors as the input data. The output part 24 outputs a wafer processing result (for example, wafer-plane image data) which is a process result output by the learned model, and ends the inference process. Thus, it is possible to obtain, for example, the simulation result of the semiconductor manufacturing process when a new component is used, with high accuracy and efficiency.

As described above, in the simulation system including the simulation device 30, the learning device 10, and the inference device 20 according to the present embodiment, simulation conditions other than the hardware configuration of the predetermined component are fixed. Therefore, the predetermined number of feature vectors calculated from the simulation data can be input to the input layer of the learning model as features that characterize the hardware configuration of the predetermined component. Accordingly, the semiconductor manufacturing process corresponding to the hardware configuration of the predetermined component can be simulated using the learned model. Thus, a user can recognize the process result when the shape of the predetermined component is changed based on the output wafer-plane image data, which is the result of the simulation using the learned model, with high accuracy and efficiency.

Further, by setting the number of feature vectors extracted from the simulation data to be identical, it is possible to obtain the data input to the input layer of the learning model. Thus, machine learning for the simulation of the semiconductor manufacturing process can be efficiently performed.

Figure 8:
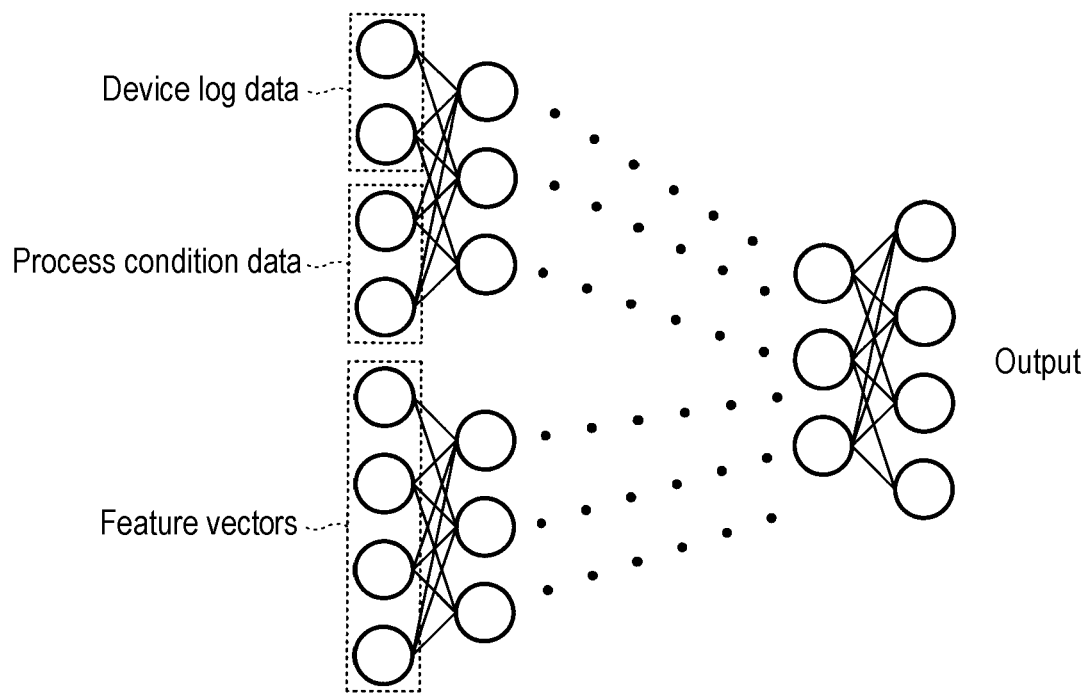
FIG. 8 is a diagram illustrating an example of transition learning using feature vectors according to an embodiment of the present disclosure.

In addition, as illustrated in FIG. 8, by performing transition learning in which process condition data is added to another input layer or device log data is added for learning, using the learned model learned in advance by inputting the feature vectors, it is possible to improve the learning efficiency and expand the learning target.

In particular, in order to improve the accuracy of the process result by simulation, it is preferable to learn by inputting data on how much the semiconductor manufacturing apparatus has been used. Therefore, the learning model of a portion in which the feature vectors are input to the input layer uses parameters of the learned model as they are and inputs the device log data together with the process condition data to the input layer for learning, thereby obtaining a more accurate simulation result in consideration of the usage degree of the semiconductor manufacturing apparatus.

Figure 9:
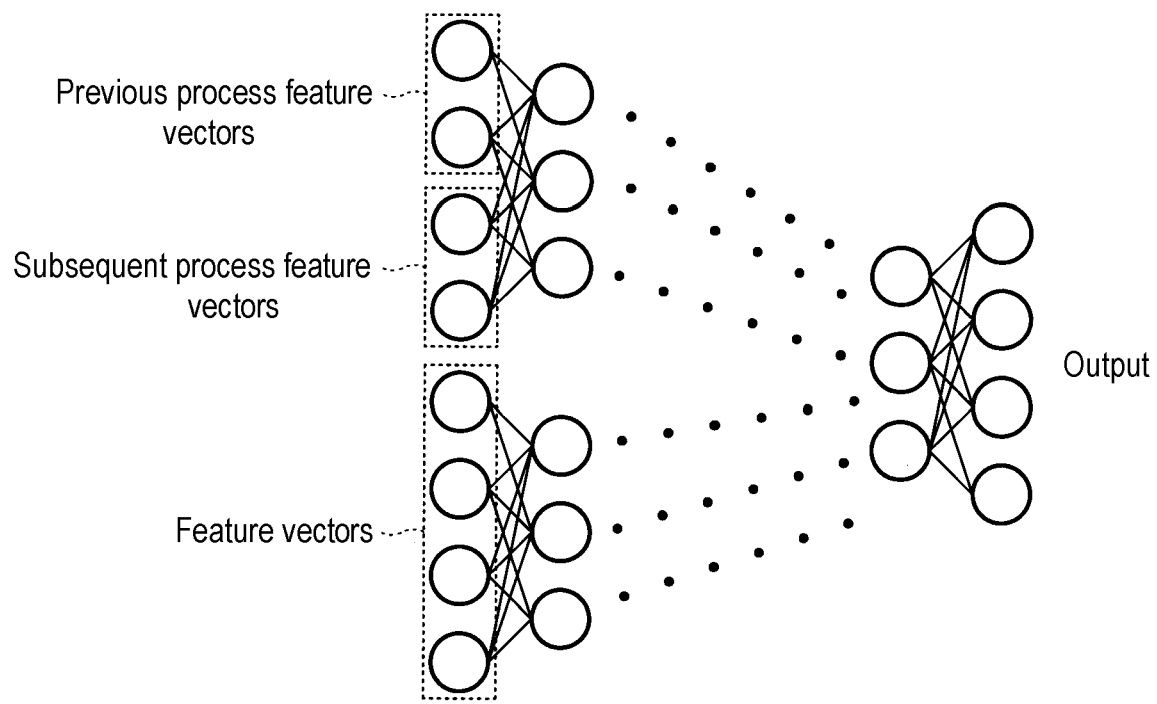
FIG. 9 is a diagram illustrating an example of transition learning using feature vectors according to an embodiment of the present disclosure.

In addition, there are cases where it is desired to recognize a final process result by combining simulations of individual processes. For example, a case where it is desired to determine a final process result by combining simulations of the individual processes of the film forming process, the etching process, and the ashing process, may be considered. In this case, as illustrated in FIG. 9, the learning model of the portion, in which the feature vectors of this process are input to the input layer, uses the parameters of the learned model as they are, and performs transition learning in which the feature vectors of a previous process and the feature vectors of a subsequent process are added to another input layer. Thus, it is possible to improve the learning efficiency, to obtain process results according to the combination, and to efficiently obtain highly accurate simulation results for the processes of the semiconductor manufacturing process according to various combinations.

It should be noted that the learning device, the inference device, and the learned model according to one embodiment of the present disclosure disclosed herein are exemplary in all respects and are not restrictive. The above-described embodiments may be omitted, replaced or modified in various forms without departing from the scope and spirit of the appended claims. The matters described in the aforementioned embodiments may have other configurations to the extent that they are not inconsistent, and may be combined to the extent that they are not inconsistent.

In this specification, the wafer has been described as an example of an object to be processed. However, the object to be processed is not limited thereto and may be various substrates, printed circuit boards, or the like used for a flat panel display (FPD).

The learning device 10, the inference device 20, and the simulation device 30 of the present disclosure may be implemented by any of a personal computer, a server, a tablet side terminal, a smartphone, a wearable device, and any other information processing devices. Further, the learning device 10 and the simulation device 30 may be implemented by the same device or different devices. Similarly, the inference device 20 and the simulation device 30 may be implemented by the same device or different devices. Also, the learning device 10 and the inference device 20 may be implemented by the same device or different devices.

Furthermore, there has been described a case where the learning device 10 of the present disclosure performs the machine learning based on a neural network and the inference device 20 is implemented by the learned neural network. However, the present disclosure is not limited thereto and may be implemented by various machine learning models.

This international application is based upon and claims the benefit of priority from Japanese Patent Application No. 2018-171015, filed on Sep. 12, 2018, the entire contents of which are incorporated herein by reference.

EXPLANATION OF REFERENCE NUMERALS

10: learning device, 11: calculation part, 12: input part, 13: processing part, 14: storage part, 15: simulation data DB, 20: inference device, 21: calculation part, 22: input part, 23: execution part, 24: output part, 25: storage part, 30: simulation device, 31: execution part, 32: storage part, 33: simulation model, 34: environmental information, 35: process condition DB, 36: gas pipe data, 37: device log DB

The invention claimed is:

1. A learning device for performing a machine learning based on a learning model using data input to an input layer, comprising:
a calculation part configured to calculate a predetermined number of features, in which simulation data of a result of performing simulation of semiconductor manufacturing processes by setting environmental information inside a process vessel in which the semiconductor manufacturing processes are performed and using a predetermined component provided in the process vessel as a variable; and
an input part configured to input the calculated predetermined number of features to the input layer,
wherein the simulation data is associated with XY coordinates parallel to a plane of a wafer.

2. The learning device of claim 1, wherein the calculation part is configured to calculate the predetermined number of features, in which the simulation data of the result of performing simulation of the semiconductor manufacturing processes for a flow of a gas by setting the environmental information on the gas and using the component in a shape of a gas pipe, and the XY coordinates are associated with each other.

3. The learning device of claim 2, wherein the calculation part is configured to calculate the predetermined number of features, in which a predetermined number of XY coordinates scattered at equal intervals parallel to the plane of the wafer and the simulation data on the plane of the wafer of the predetermined number of XY coordinates are associated with each other.

4. The learning device of claim 3, wherein the calculation part is configured to calculate the predetermined number of features for each process by referring to a storage part configured to store the simulation data as a result of setting process conditions for each process of the semiconductor manufacturing processes and performing the simulation for each process.

5. The learning device of claim 4, wherein the calculation part is configured to repeat a process of calculating the predetermined number of features, in which the simulation data of the result of performing simulation of the semiconductor manufacturing processes using a plurality of components provided in the process vessel and the XY coordinates are associated with each other, and
the input part is configured to input the calculated predetermined number of features to the input layer each time the process is repeated.

6. The learning device of claim 5, further comprising a processing part configured to perform the simulation of the semiconductor manufacturing processes based on a neural network using the predetermined number of features input to the input layer as teaching data.

7. The learning device of claim 6, wherein the predetermined number of features are identical in number.

8. The learning device of claim 7, wherein the simulation data is image data of the plane of the wafer.

9. The learning device of claim 8, wherein the calculation part is configured to calculate the predetermined number of features by processing the image data of the plane of the wafer into a two-dimensional array form corresponding to sizes of the image data of the wafer plane in X and Y directions.

10. An inference device equipped with a learned model learned by the learning device of claim 1, comprising:
a calculation part configured to calculate a predetermined number of features, in which simulation data of a result of performing simulation of semiconductor manufacturing processes by setting environmental information in a process vessel in which the semiconductor manufacturing processes are performed and using a predetermined component provided in the process vessel as a variable, and XY coordinates parallel to a plane of a wafer are associated with each other;
an input part configured to input the calculated predetermined number of features to an input layer; and
an execution part configured to perform simulation of the semiconductor manufacturing processes by the learned model using the predetermined number of features input to the input layer.

11. The inference device of claim 10, further comprising an output part configured to output process result data obtained by performing the simulation.

12. The learning device of claim 1, wherein the calculation part is configured to calculate the predetermined number of features, in which a predetermined number of XY coordinates scattered at equal intervals parallel to the plane of the wafer and the simulation data on the plane of the wafer of the predetermined number of XY coordinates are associated with each other.

13. The learning device of claim 1, wherein the calculation part is configured to calculate the predetermined number of features for each process by referring to a storage part configured to store the simulation data as a result of setting process conditions for each process of the semiconductor manufacturing processes and performing the simulation for each process.

14. The learning device of claim 1, wherein the calculation part is configured to repeat a process of calculating the predetermined number of features, in which the simulation data of the result of performing simulation of the semiconductor manufacturing processes using a plurality of components provided in the process vessel and the XY coordinates are associated with each other, and the input part is configured to input the calculated predetermined number of features to the input layer each time the process is repeated.

15. The learning device of claim 1, further comprising a processing part configured to perform the simulation of the semiconductor manufacturing processes based on a neural network using the predetermined number of features input to the input layer as teaching data.

16. The learning device of claim 1, wherein the simulation data is image data of the plane of the wafer.

17. A learned model in which a machine learning is performed based on a learning model using data input to an input layer, wherein the learned model causes a computer to function as:

a calculation part configured to calculate a predetermined number of features, in which simulation data of a result of performing simulation of semiconductor manufacturing processes by setting environmental information in a process vessel in which the semiconductor manufacturing processes are performed and using a predetermined component provided in the process vessel as a variable; and an input part configured to input the calculated predetermined number of features to the input layer, wherein the simulation data is associated with XY coordinates parallel to a plane of a wafer.

* * * * *